United States Patent
Okada et al.

(10) Patent No.: US 8,628,881 B2
(45) Date of Patent: Jan. 14, 2014

(54) LITHIUM SECONDARY BATTERY CATHODE

(75) Inventors: Shigeki Okada, Nishio (JP); Tsutomu Nanataki, Toyoake (JP); Nobuyuki Kobayashi, Nagoya (JP); Jun Yoshikawa, Nagoya (JP); Akira Urakawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 134 days.

(21) Appl. No.: 13/286,513

(22) Filed: Nov. 1, 2011

(65) Prior Publication Data
US 2012/0121978 A1 May 17, 2012

Related U.S. Application Data

(60) Provisional application No. 61/414,487, filed on Nov. 17, 2010.

(51) Int. Cl.
*H01M 4/13* (2010.01)
*H01M 10/052* (2010.01)
*H01M 10/0525* (2010.01)
*H01M 4/131* (2010.01)
*H01M 4/505* (2010.01)
*H01M 4/525* (2010.01)

(52) U.S. Cl.
USPC .................................. 429/209; 429/231.1

(58) Field of Classification Search
USPC .................... 429/209, 231.1, 231.3
See application file for complete search history.

(56) References Cited

U.S. PATENT DOCUMENTS

| 6,818,351 | B2 | 11/2004 | Sunagawa et al. |
| 2010/0173204 | A1 | 7/2010 | Sugiura et al. |

FOREIGN PATENT DOCUMENTS

| JP | 2001-085009 | 3/2001 |
| JP | 2002-251996 | 9/2002 |
| JP | 2002-270173 | 9/2002 |
| JP | 2004-182564 | 7/2004 |
| WO | WO 2010021205 A1 * | 2/2010 |
| WO | 2010/074314 A1 | 7/2010 |

OTHER PUBLICATIONS

U.S. Appl. No. 13/286,514, filed Nov. 1, 2011, Okada et al.
International Search Report and Written Opinion dated Jan. 24, 2012.

* cited by examiner

*Primary Examiner* — Gregg Cantelmo
(74) *Attorney, Agent, or Firm* — Burr & Brown, PLLC

(57) ABSTRACT

An object of the present invention is to provide a lithium secondary battery cathode which can more improve characteristics of the battery. The cathode of the present invention includes a first layer composed of a plate-like cathode active material and a second layer containing particles of the cathode active material and a binder, the second layer being joined to the first layer in a stacked state.

8 Claims, 2 Drawing Sheets

LITHIUM SECONDARY BATTERY CATHODE

BACKGROUND OF THE INVENTION

1. Field of the Invention

The present invention relates to a cathode of a lithium secondary battery.

2. Description of the Related Art

Lithium complex oxides (lithium transition metal oxides) such as lithium cobaltate ($LiCoO_2$) and lithium-nickel-manganese-cobalt complex oxides are widely known as a cathode active material for producing a cathode of a lithium secondary battery (may be referred to as a lithium ion secondary battery). As has been widely known, in the cathode active material, intercalation and deintercalation of lithium ions ($Li^+$) occur, whereby charge and discharge of the lithium secondary battery are carried out.

SUMMARY OF THE INVENTION

Hitherto, various efforts have been made to modify the structural characteristics of the cathode for enhancing performance (e.g., discharged capacity) of such batteries. For example, there has been carried out optimization of the particle size and packing rate of the cathode active material (see, for example, Japanese Patent Application Laid-Open (kokai) Nos. 2001-85009, 2002-251996, 2002-270173, and 2004-182564). However, these conventional techniques have not sufficiently improved the battery characteristics.

In this regard, the applicant of the present invention has studied such a cathode (see, for example, WO 2010/074314 A1). The present inventors have carried out extensive studies, and have found a specific configuration of a cathode which exhibits more excellent characteristics. The present invention has been accomplished on the basis of this finding.

—Configuration—

The lithium secondary battery cathode (hereinafter may be referred to simply as "cathode" in accordance with needs) of the present invention comprises:

a first layer composed of a plate-like cathode active material (hereinafter may be referred to simply as "cathode active material sheet" in accordance with needs); and a second layer containing particles of the cathode active material (hereinafter may be referred to simply as "cathode active material particles" in accordance with needs) and a binder, the second layer being joined to the first layer in a stacked state.

That is, a characteristic feature of the cathode of the present invention resides in that the cathode has a cathode active material layer formed of a stacked body which comprises a first layer composed of the cathode active material, and a second layer containing the cathode active material particles and the binder. The first layer may be joined to an electroconductive current collector of cathode in a stacked state.

A specific example of the cathode active material is a lithium complex oxide. The lithium complex oxide has a crystal structure, for example, a layered rock salt structure. As used herein, the term "layered rock salt structure" refers to a crystal structure in which lithium layers and layers of a transition metal other than lithium are alternatively with an oxygen layer therebetween (typically, $\alpha$-$NaFeO_2$ type structure: cubic rock salt type structure in which transition metal element and lithium element are arrayed orderly in the direction of the [111] axis). The lithium complex oxide serving as the cathode active material may also be such an oxide having no layered rock salt structure but has a spinel structure (e.g., lithium manganate $LiMn_2O_4$ or lithium nickel manganate $LiNi_{0.25}Mn_{0.75}O_4$).

In the case where the lithium complex oxide serving as the cathode active material forming the first layer has a layered rock salt structure, the ratio of intensity of diffraction by the (003) plane to intensity of diffraction by the (104) plane, (003)/(104), as obtained through X-ray diffraction of a surface (plate surface) of the first layer, is preferably 1.6 or less. In the case where the cathode active material particles contained in the second layer assume the form of plate-like particles, X-ray diffraction of a surface (plate surface) of each plate-like particle preferably falls within the same range.

Preferably, the cathode is formed so as to satisfy the relationship: $0.02 \leq r \leq 0.2$, wherein r is t2/t1, t1 represents the thickness of the first layer, and t2 represents the thickness of the second layer.

—Effects—

In the cathode of the present invention having the aforementioned configuration, the packing ratio and surface area of the cathode active material in the cathode active material layer increase as compared with those attained in conventional techniques. Thus, excellent discharged capacity (discharged capacity retaining performance) as compared with those attained in conventional techniques can be attained.

DETAILED DESCRIPTION OF THE INVENTION

Preferred embodiments of the present invention will next be described with reference to examples and comparative examples. The following description of the embodiments is nothing more than the specific description of mere example embodiments of the present invention to the possible extent in order to fulfill description requirements (descriptive requirement and enabling requirement) of specifications required by law.

Thus, as will be described later, naturally, the present invention is not limited to the specific configurations of embodiments and examples to be described below. Modifications that can be made to the embodiments and examples are collectively described herein at the end to a maximum possible extent, since insertion thereof into the description of the embodiments would disturb understanding of consistent description of the embodiments.

1. CONFIGURATION OF LITHIUM SECONDARY BATTERY

Figure 1A:
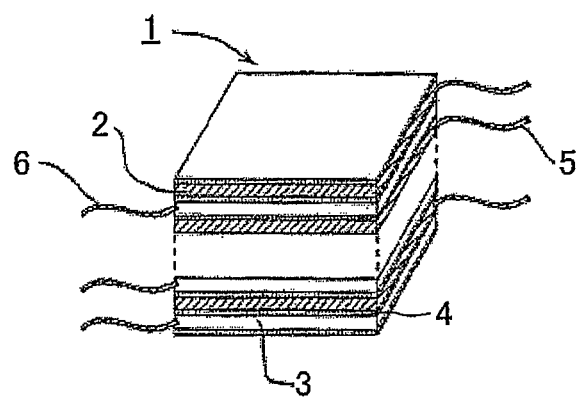
FIG. 1A is a sectional view of the schematic configuration of an exemplary lithium secondary battery to which one embodiment of the present invention is applied.

FIG. 1A is a sectional view of the schematic configuration of an example lithium secondary battery 1 to which one embodiment of the present invention is applied. Referring to FIG. 1A, the lithium secondary battery 1 is a so-called liquid-electrolyte type battery and includes cathodes 2, anodes 3, separators 4, cathode tabs 5, and anode tabs 6.

The separator 4 is provided between the cathode 2 and the anode 3. That is, the cathode 2, the separator 4, and the anode 3 are stacked in this order. The cathode tabs 5 are electrically connected to the respective cathodes 2. Similarly, the anode tabs 6 are electrically connected to the respective anodes 3.

The lithium secondary battery 1 shown in FIG. 1A is configured such that a stack of the cathodes 2, the separators 4, and the anodes 3, and an electrolytic solution containing a lithium compound as an electrolyte are liquid-tightly sealed in a specific battery casing (not illustrated).

Figure 1B:
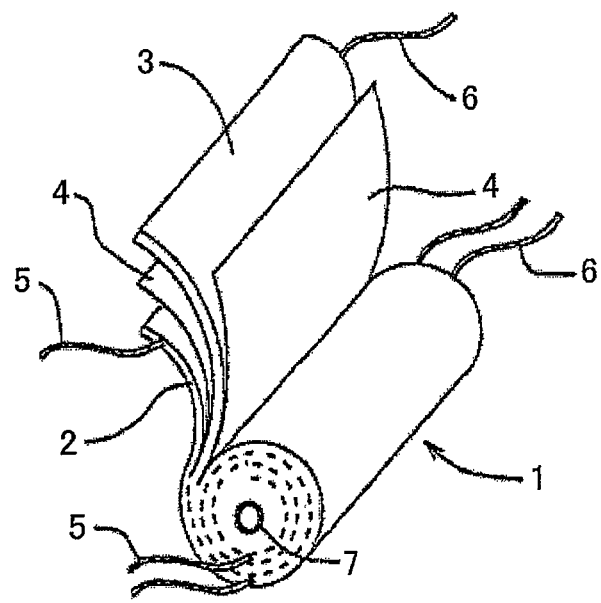
FIG. 1B is a perspective view of the schematic configuration of another exemplary lithium secondary battery to which one embodiment of the present invention is applied.

FIG. 1B is a perspective view of the schematic configuration of another example lithium secondary battery 1 to which one embodiment of the present invention is applied. Referring to FIG. 1A, this lithium secondary battery 1 is also a liquid-electrolyte type battery and includes a cathode 2, an anode 3, separators 4, cathode tabs 5, anode tabs 6, and a core 7.

The lithium secondary battery 1 shown in FIG. 1B is configured such that an internal electrode formed through winding, onto the core 7, of a stack of the cathode 2, the separators 4, and the anode 3, and the aforementioned electrolytic solution are liquid-tightly sealed in a specific battery casing (not illustrated).

Figure 2:
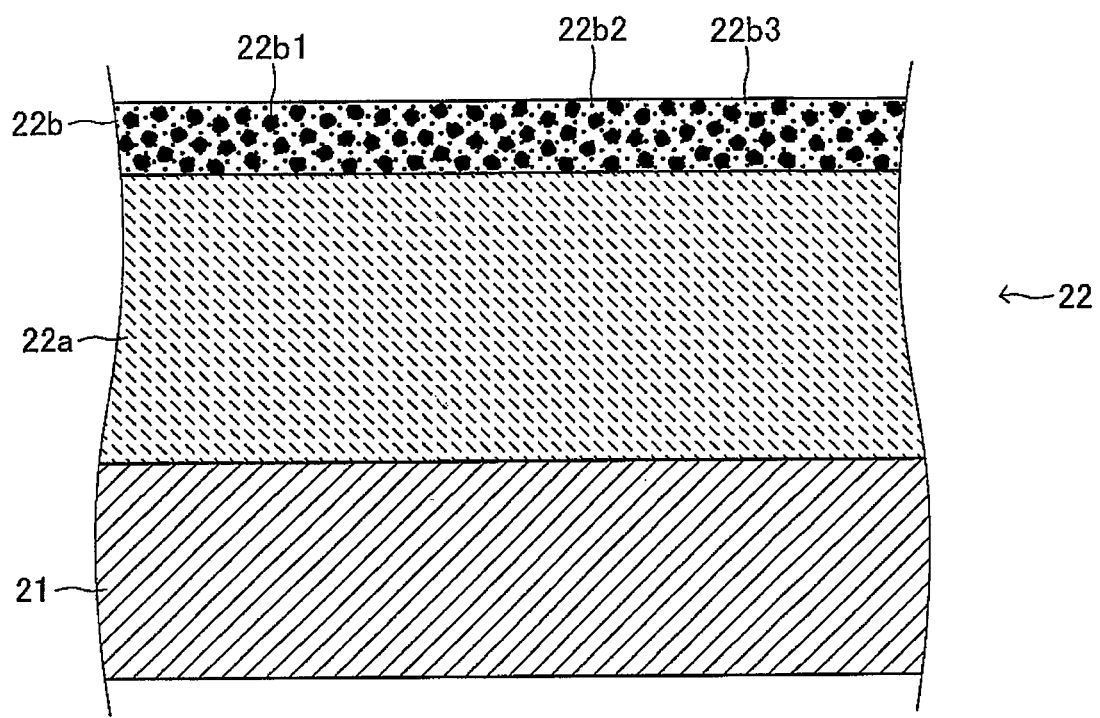
FIG. 2 is an enlarged sectional view of the cathode to which one embodiment of the present invention is applied, shown in FIG. 1A or 1B.

FIG. 2 is an enlarged sectional view of the cathode 2 (an embodiment of the invention) shown in FIG. 1A or 1B. Referring to FIG. 2, the cathode 2 includes a cathode current collector 21 and a cathode active material layer 22. In other words, the cathode 2 is formed such that the cathode collector 21 is joined to (stacked on) the cathode active material layer 22.

The cathode active material layer 22 has a first layer $22a$ and a second layer $22b$. The first layer $22a$ is composed of a plate-like cathode active material and is stacked on and joined to the cathode current collector 21. The second layer $22b$ is formed from a mixture of cathode active material particles $22b1$, an electroconducting additive $22b2$, and a binder $22b3$, and is stacked on and joined to the first layer $22a$.

The first layer $22a$ and the cathode active material particles $22b1$ are formed of a lithium complex oxide having a composition represented by the following formula:

$$Li_pM_qO_2 \quad \text{formula:}$$

(wherein M represents at least one member selected from the group consisting of Co, Ni, Al, Mn, and Mg).

In this embodiment, the cathode active material layer 22 is formed such that r satisfies the condition $0.02 \leq r \leq 0.2$ (r=t2/t1), wherein t1 represents the thickness of the first layer $22a$, and t2 represents the thickness of the second layer $22b$.

2. EFFECTS ATTAINED BY THE STRUCTURE OF THE EMBODIMENT

In the cathode 2 having the aforementioned structure, the packing ratio and surface area of the cathode active material in the cathode active material layer 22 increase as compared with those attained in conventional techniques. Thus, excellent discharged capacity (discharged capacity retaining performance) as compared with those attained in conventional techniques can be attained. The mechanism has not been elucidated in detail, but one possible reason is as follows.

A non-patent document (Shota Kobayashi, Yoshiharu Uchimoto, "Lithium Ion Phase-Transfer Reaction at the Interface between the Lithium Manganese Oxide Electrode and the Nonaqueous Electrolyte," J. Phys. Chem. B 2005, 109, p. 13322-13326) discloses the following process occurring during discharge at cathode. (1) Solvated lithium ions are adsorbed by the surface of the cathode active material before insertion of lithium ions into the cathode active material. In the process, a part of solvent molecules are released from lithium ions. (2) The remaining solvent molecules are released from lithium ions, and then the lithium ions are inserted into the cathode active material.

In the cathode 2 having the aforementioned structure, the cathode active material surface area can be increased without reducing the cathode active material packing ratio of the cathode active material layer 22, whereby the number of reaction sites involved in the aforementioned desolvation process can be increased. Conceivably, discharged capacity (discharged capacity retaining performance) more excellent as compared with those attained by the aforementioned conventional techniques can be attained through the above mechanism.

Particularly when the cathode active material (first layer $22a$ and/or cathode active material particles $22b1$) contained in the cathode active material layer 22 is a lithium complex oxide having a layered rock salt structure, at least the degree of orientation of (104) plane of the first layer $22a$ (the degree of exposure of (104) plane on a surface, particularly a plate surface) is preferably high. Specifically, the peak intensity ratio (003)/(104) is preferably 1.6 or less. One possible reason therefore is as follows.

According to the configuration of this embodiment, the aforementioned process (1) is promoted by an increase in specific surface of the cathode active material attributable to the presence of the second layer $22b$, and the (104) plane, where lithium ions are readily intercalated into a surface (plate surface), is exposed, whereby the process (2) is also promoted. Thus, intercalation of lithium ions are very smoothly performed during a discharge process, whereby excellent discharged capacity discharged capacity retaining performance) are attained.

The cathode is preferably formed so as to satisfy the relationship: $0.02 \leq r \leq 0.2$, wherein r is t2/t1, t1 represents the thickness of the first layer $22a$, and t2 represents the thickness of the second layer $22b$ of the cathode active material layer 22 A conceivable reason is as follows.

When r is smaller than 0.02 (the second layer $22b$ is excessively thin), the effect on increasing the surface area of the cathode active material layer 22 is poor, thereby failing to attain excellent discharged capacity (discharged capacity retaining performance), whereas when r is more than 0.2 (the second layer $22b$ has an excessive thickness), the volume fraction of cathode active material in the cathode active material layer 22 decreases, resulting in reduction in discharged capacity.

In the meantime, cracks may be caused in the first layer $22a$ as a plate-like cathode active material at the time of manufacturing the lithium secondary battery 1. For example, applied pressure causes above-mentioned cracks when joining the cathode current collector 21 and the cathode active material layer 22.

Also, internal stress may be accumulated in the first layer $22a$ as a plate-like cathode active material due to crystal strain accompanied by transfer of Lithium ions when charge and discharge are repeated. The cracks may be occurred in the first layer $22a$ by foregoing accumulation of internal stress.

In this regard, excellent battery characteristics are maintained by the configuration of this embodiment in the case that the cracks are occurred in the first layer $22a$. That is because conductive components (which are mainly the electroconducting additives $22b2$) contained in the second layer $22b$ interfuse in the cracks. That is, the configuration of this embodiment realizes self-repairing ability of the cathode active material layer 22 against cracks.

3. SPECIFIC EXAMPLES (EXAMPLES)

There will next be described a specific example of the method for producing the cathode 2 of the present embodiment, along with the results of evaluation thereof.

3-1. Production Method
3-1-1. Production of Cathode Active Material Sheet (First Layer 22a)

Specific Example 1

One-Step Heat Treatment Process (1) Preparation of Slurry $Li_2CO_3$ powder (particle size: 10 to 50 μm; product of Kanto Chemical Inc.) (33.1 parts by weight), NiO powder (particle size: 1 to 10 μm; product of Seido Kagaku Kogyo Co., Ltd.) (50.2 parts by weight), $Co_3O_4$ powder (particle size: 1 to 5 μm; product of Seido Kagaku Kogyo Co., Ltd.) (14.4 parts by weight), and $Al_2O_3$ powder (particle size: 1 to 10 μm; product of Showa Denko K.K.) (2.3 parts by weight) were mixed and milled by means of a ball mill to a mean particle size of 0.5 μm. The resultant powder (100 parts by weight) was mixed with a dispersion medium (toluene: 2-propanol=1:1) (100 parts by weight), a binder (polyvinyl butyral: product No. BM-2; product of Sekisui Chemical Co. Ltd.) (10 parts by weight), a plasticizer (DOP: Bis(2-ethylhexyl)phthalate; product of Kurogane Kasei Co., Ltd.) (4 parts by weight), and a dispersant (product name RHEODOL SPO-30, product of Kao Corp.) (2 parts by weight). The resultant mixture was stirred under reduced pressure for defoaming, and the viscosity thereof was adjusted to 3,000 to 4,000 cP. (The viscosity was measured by means of an LVT-type viscometer, a product of Brookfield Co., Ltd. The same procedure was applied to the following Example).

(2) Forming

The thus-prepared slurry was formed into a sheet on a PET film through the doctor blade process such that the thickness of the sheet as measured after drying was adjusted to 50 μm. The sheet product was removed from the PET film and was pierced into numerous pieces by means of a multi-punching machine (Type: NP-7150, product of UHT corporation) then 1-mm-square compacts were prepared.

(3) Heat Treatment

The thus-produced square pieces were placed on a setter (dimensions: 90 mm square×1 mm high) made of zirconia and sintered in an oxygen atmosphere at 800° C. for 10 hours, to thereby yield cathode active material plates having a composition of $Li(Ni_{0.75}Co_{0.2}Al_{0.05})O_2$. After sintering, the produced cathode active material plates were found to have a thickness of 50 μm and a square side of 900 μm.

Specific Example 2

Two-Step Heat Treatment Process (1) Preparation of Slurry

NiO powder (particle size: 1 to 10 μm; product of Seido Kagaku Kogyo Co., Ltd.) (75.1 parts by weight), $Co_3O_4$ powder (particle size: 1 to 5 μm; product of Seido Kagaku Kogyo Co., Ltd.) (21.5 parts by weight), and $Al_2O_3$ powder (particle size: 1 to 10 μm; product of Showa Denko K.K.) (3.4 parts by weight) were mixed and milled. The powder was heated in air at 1,000° C. for five hours, to thereby synthesize $(Ni_{0.75}, Co_{0.2}, Al_{0.05})O$ powder. The powder was further milled by means of a ball mill, to thereby prepare raw material particles of $(Ni_{0.75}, Co_{0.2}, Al_{0.05})O$. The raw material (100 parts by weight) was mixed with a dispersion medium (toluene: 2-propanol=1:1) (100 parts by weight), a binder (polyvinyl butyral: product No. BM-2; product of Sekisui Chemical Co. Ltd.) (10 parts by weight), a plasticizer (DOP: Bis(2-ethylhexyl)phthalate; product of Kurogane Kasei Co., Ltd.) (4 parts by weight), and a dispersant (product name RHEODOL SPO-30, product of Kao Corp.) (2 parts by weight). The resultant mixture was stirred under reduced pressure for defoaming, and the viscosity thereof was adjusted to 3,000 to 4,000 cP.

(2) Forming

The thus-prepared slurry was formed into a sheet on a PET film through the doctor blade process such that the thickness of the sheet as measured after drying was adjusted to 50 The sheet product was removed from the PET film and was pierced into numerous pieces by means of a multi-punching machine (Type: NP-7150, product of UHT corporation) then 1-mm-square compacts were prepared.

(3) Calcining

The thus-produced square pieces were placed on a setter (dimensions: 90 mm square×1 mm high) made of zirconia and calcined in air at 900° C. for 10 hours.

(4) Incorporation of Lithium

The thus-produced $(Ni_{0.75}, Co_{0.2}, Al_{0.05})O$ ceramic plates and LiOH powder (product of Kanto Chemical Inc.) were mixed at a mole ratio $Li/(Ni_{0.75}, Co_{0.2}, Al_{0.05})$ of 1.5, and the mixture was sintered in an oxygen atmosphere at 800° C. for 10 hours, to thereby yield cathode active material plates having a composition of $Li(Ni_{0.75}Co_{0.2}Al_{0.05})O_2$. After sintering, the produced cathode active material plates were found to have a thickness of 50 μm and a square side of 1,000 μm.

3-1-2. Production of Cathode (1) Joining of Cathode Active Material Plate to Cathode Current Collector The thus-produced cathode active material plates (first layer 22a) were scatteredly placed on an aluminum tray, and then moved to the center of the tray from each corner by means of a spatula, whereby the plates were 2-dimensionally disposed without overlapping.

Subsequently, an electroconductive synthetic resin was applied, at a small coating thickness, onto aluminum foil having a thickness of 20 μm for forming a cathode current collector. Then, the aluminum foil was placed on the cathode active material plates which were 2-dimensionally disposed on the tray, such that the conductive-resin-coated surface of the aluminum foil faced the cathode active material plates. The aluminum foil was lightly pressed to the plates to ensure tight bonding between the cathode active material plates and the aluminum foil, whereby the aluminum foil was joined to the cathode active material plates.

(2) Preparation of Cathode-Material-Mixture Paste

A powder mixture of $Li_2CO_3$, NiO, $Co_3O_4$, and $Al_2O_3$ prepared at the same compositional proportions was sintered in oxygen at 800° C. for 10 hours, to thereby produce a powder of cathode active material particles having a composition of $Li(Ni_{0.75}Co_{0.2}Al_{0.0.5})O_2$. The thus-produced cathode active material powder (92 parts by weight), poly(vinylidene fluoride) serving as a binder (3 parts by weight), acetylene black serving as a conduction aid (5 parts by weight), and N-methyl-2-pyrrolidone serving as a solvent were kneaded, to thereby prepare a cathode-material-mixture paste for forming the second layer.

(3) Application of Cathode-Material-Mixture Paste

The thus-prepared cathode-material-mixture paste was applied, by means of a screen printing apparatus, onto cathode active material plates supported by aluminum foil, to thereby form a pre-cathode sheet. The pre-cathode sheet was found to have a thickness of 75 μm as measured after drying, and the cathode-material-mixture paste (in which cathode active material powder and conductive material are contained)-coated layer has a thickness of 3 μm as measured after drying, the thickness not including the thickness of aluminum foil and that of the cathode active material plate.

3-2. Evaluation Method

The production conditions employed in the Example were modified as desired, to thereby produce cathodes of Experiment Examples 1 to 3 and Comparative Example 1 (in Table 1 given below, "Specific Example 1" corresponds to "Experiment Example 1," and "Specific Example 2" corresponds to "Experiment Example 3"). The evaluation method therefore will next be described.

The pre-cathode sheet produced through the aforementioned procedure was cut into disks (diameter: 15 mm) serving as cathodes. One of the thus-produced cathodes, an anode plate formed of a lithium metal plate, an anode current collector plate made of stainless steel, and a separator were arranged in the order of cathode-separator-anode-anode collector plate, such that the aluminum foil-side of the cathode is disposed on the outside (the side opposite the separator). The stacked body was filled with an electrolytic solution, thereby fabricating a coin cell. The electrolytic solution was prepared by dissolving $LiPF_6$ in an equivolume mixture of ethylene carbonate (EC) and diethyl carbonate (DEC) serving as an organic solvent to a concentration of 1 mol/L.

The thus-produced coin cell was tested. Specifically, one cycle consists of the following charge and discharge operations: constant-current charge is carried out at a 1 C rate of current until the cell voltage becomes 4.3 V; subsequently, constant-voltage charge is carried out under a current condition of maintaining the cell voltage at 4.3 V, until the current drops to 1/20, followed by 10 minutes rest; and then, constant-current discharge is carried out at a IC rate of current until the cell voltage becomes 3.0 V, followed by 10 minutes rest. Two cycles were performed at 25° C. The discharged capacity measured in the second cycle was employed as "discharged capacity" of the coin cell.

The orientation degree of (104) plane of a cathode active material plate (first layer 22a) was evaluated through X-ray diffraction (XRD) in the following manner.

The cathode active material plates were placed on a planar glass such that the plate surfaces of the cathode active material plates were in parallel with the planar glass surface and overlapping was prevented. By means of an XRD apparatus (GEIGER FLEX RAD-IB, product of Rigaku Corp.), the surfaces of the plate-like particles (cathode active material plates) were irradiated with X-ray so as to measure an XRD profile, thereby obtaining the ratio of intensity (peak height) of diffraction by the (003) plane to intensity (peak height) of diffraction by the (104) plane, (003)/(104). In the above-mentioned method, the plate surface of the cathode active material plates are in surface contact with the glass substrate surface, so that the plate surface of the cathode active material plate is in parallel with the planar glass surface. Thus, according to the above-mentioned method, there is obtained a profile of diffraction by crystal faces present in parallel with crystal faces of the particle plate surface; i.e., a profile of diffraction by crystal faces oriented in a plate surface direction of a plate-like particle.

3-3. Results of Evaluation

In Experiment Example 2, the coating thickness of the cathode-material-mixture paste was greater than that employed in the Example. In Comparative Example 1, no cathode-binding paste was applied.

TABLE 1

| | t1 [μm] | t2 [μm] | r | Discharged capacity [mAh/g] | Peak intensity ratio (003)/(104) |
|---|---|---|---|---|---|
| Exp. Ex. 1 | 50 | 3 | 0.06 | 160 | 2.0 |
| Exp. Ex. 2 | 50 | 10 | 0.20 | 150 | 2.0 |
| Exp. Ex. 3 | 50 | 3 | 0.06 | 165 | 1.0 |
| Comp. Ex. 1 | 50 | 0 | 0.00 | 70 | 2.0 |

As is clear from Table 1, a large discharged capacity was obtained at a rate as high as 1 C by through employment of a cathode having a configuration as shown in FIG. 2. That is, excellent discharged capacity retaining performance was attained through employment of a cathode having such a configuration. In contrast, in Comparative Example 1 employing no second layer 22b in shown in FIG. 2, the capacity was low, and discharged capacity retaining performance was deteriorated.

In Experiment Example 3 employing a two-step heat treatment process, the degree of orientation of (104) plane of the cathode active material plate (first layer 22a) increased, whereby more excellent discharged capacity was realized. The reason why the orientation degree is enhanced by the thermal treatment process has not yet been clarified in detail, one possible reason is as follows.

Grain growth of a crystal grain in a specific direction (preferential orientation) is controlled by strain energy and surface energy. As used herein, the term "strain energy" refers to a stress induced by internal stress generated during grain growth, defects, etc. Generally, layered compounds are known to have a large strain energy. The (003) plane is most stable in terms of surface energy, and the (101) and (104) planes are stable in terms of strain energy.

Therefore, the process including calcining (first heat treatment) and incorporation of lithium (second heat treatment) is applied, strain energy predominates with change in volume during incorporation of lithium. As a result, only crystal grains having a lowest-strain-energy crystal face in a green sheet (formed by "Forming" step described above) plane selectively grow in an in-plane direction, to thereby form flat (plate-like) grains. Thus, $Li(Ni_{0.75}Co_{0.2}Al_{0.05})O_2$ ceramic plates (cathode active material sheet fragments) having a large aspect ratio and a specific crystal face (i.e., (104) plane) which is oriented in parallel with the plate surface are conceivably formed.

4. EXAMPLES OF MODIFICATIONS

The above-described embodiment and specific examples are, as mentioned above, mere examples of the best mode of the present invention which the applicant of the present invention contemplated at the time of filing the present application. The above-described embodiment and specific examples should not be construed as limiting the invention. Various modifications to the above-described embodiment and specific examples are possible, so long as the invention is not modified in essence.

Several modifications will next be exemplified. In the following description of the modifications, component members similar in structure and function to those of the above-described embodiment are denoted by names and reference numerals similar to those of the above-described embodiment. The description of the component members appearing in the above description of the embodiment can be applied as appropriate, so long as no inconsistencies are involved.

Needless to say, even modifications are not limited to those described below. Limitingly construing the present invention based on the above-described embodiment and the following modifications impairs the interests of an applicant (particularly, an applicant who is motivated to file as quickly as possible under the first-to-file system) while unfairly benefiting imitators, and is thus impermissible.

The structure of the above-described embodiment and the structures of the modifications to be described below are entirely or partially applicable in appropriate combination, so long as no technical inconsistencies are involved.

The structure of the lithium secondary battery 1 according to the present invention is not limited to the aforementioned one. For example, a gel electrolyte or a polymer electrolyte may be employed as an electrolyte.

Referring to FIG. 2, the first layer 22a may be formed into a seamless single plate (self-standing film). Alternatively, the first layer 22a may be formed by two-dimensionally placing or bonding a plurality of cathode active material plates.

No particular limitation is imposed on the composition of the cathode active material which can be employed in the present invention, and any composition other than the aforementioned one may be employed. For example, the cathode active material of the present invention may have any of the following compositions: lithium nickelate, lithium manganate, lithium nickelate manganate, lithium nickelate cobaltate, lithium cobaltate nickelate manganate, and lithium cobaltate manganate. These materials may contain one or more elements of Mg, Al, Si, Ca, Ti, V, Cr, Fe, Cu, Zn, Ga, Ge, Sr, Y, Zr, Nb, Mo, Ag, Sn, Sb, Te, Ba, Bi, etc. Among the compositions other than that employed in the Examples, lithium nickelate is particularly preferred, since the aforementioned effect can be remarkably attained.

The composition of the cathode active material plate 22a1 forming the first layer 22a and the composition of the cathode active material particles 24 contained in the second layer 22b may be identical to or different from each other. The cathode 2 or the cathode active material plate may have any 2-dimensional shape (plane shape) such as square, circle, hexagon, or a random shape. Furthermore, as described above, the cathode active material plate 22a1 forming the first layer 22a and the cathode current collector 21 may be bonded each other directly or via an electroconductive adhesive layer.

Specifically, the aforementioned cathode-material-mixture paste may contain plate-like particles as the cathode active material particles, the plate-like particles being produced by milling the cathode active material plates through the method of Specific Example 2 into particles with appropriate sizes. By use of the plate-like particles, cell characteristics (e.g., discharged capacity) are expected to be further enhanced.

The cathode active material plates forming the first layer 22a may have voids (pores) at a 30 vol. % or less. By virtue of the voids, the internal stress generated in expansion and contraction of the crystal lattice upon charge and discharge is relaxed, cycle characteristics (discharged capacity maintaining characteristics under repeated charge-discharge conditions) are expected to be further enhanced.

No particular limitation is imposed on the production method employed in the invention, and any method other than the aforementioned specific production procedure may be employed. That is, for example, the forming method (forming method for preparing sheet-like compact or forming method for preparing 2-dimensional cathode active material plates) is not limited to the aforementioned one.

Needless to say, those modifications which are not particularly referred to are also encompassed in the technical scope of the present invention, so long as the invention is not modified in essence.

Those components which partially constitute means for solving the problems to be solved by the present invention and are illustrated with respect to operations and functions encompass not only the specific structures disclosed above in the description of the above embodiment and modifications but also any other structures that can implement the operations and functions. Further, the contents (including specifications and drawings) of the prior application and publications cited herein can be incorporated herein as appropriate by reference.

The invention claimed is:

1. A lithium secondary battery cathode comprises:
    a first layer composed of a plate-shaped cathode active material and
    a second layer containing particles of the cathode active material and a binder, the second layer being joined to the first layer in a stacked state.

2. A lithium secondary battery cathode according to claim 1, wherein the first layer is joined to an electroconductive current collector of cathode in a stacked state.

3. A lithium secondary battery cathode according to claim 1, wherein the relationship: $0.02 \leq r \leq 0.2$ is satisfied, wherein r is t2/t1, t1 represents the thickness of the first layer, and t2 represents the thickness of the second layer.

4. A lithium secondary battery cathode according to claim 2, wherein the relationship: $0.02 \leq r \leq 0.2$ is satisfied, wherein r is t2/t1, t1 represents the thickness of the first layer, and t2 represents the thickness of the second layer.

5. A lithium secondary battery cathode according to claim 1, wherein the first layer has a layered rock salt structure, the ratio of intensity of diffraction by the (003) plane to intensity of diffraction by the (104) plane, (003)/(104), as obtained through X-ray diffraction of a surface of the first layer, is 1.6 or less.

6. A lithium secondary battery cathode according to claim 2, wherein the first layer has a layered rock salt structure, the ratio of intensity of diffraction by the (003) plane to intensity of diffraction by the (104) plane, (003)/(104), as obtained through X-ray diffraction of a surface of the first layer, is 1.6 or less.

7. A lithium secondary battery cathode according to claim 3, wherein the first layer has a layered rock salt structure, the ratio of intensity of diffraction by the (003) plane to intensity of diffraction by the (104) plane, (003)/(104), as obtained through X-ray diffraction of a surface of the first layer, is 1.6 or less.

8. A lithium secondary battery cathode according to claim 4, wherein the first layer has a layered rock salt structure, the ratio of intensity of diffraction by the (003) plane to intensity of diffraction by the (104) plane, (003)/(104), as obtained through X-ray diffraction of a surface of the first layer, is 1.6 or less.

* * * * *